(12) United States Patent
Schillinger et al.

(10) Patent No.: US 6,834,911 B2
(45) Date of Patent: Dec. 28, 2004

(54) MOBILE WORK MACHINE COMPRISING ACCESSIBLE PLATFORMS

(75) Inventors: Dieter Schillinger, Neuhausen (DE); Dieter Schneider, Filderstadt (DE); Hellmut Hurr, Reutlingen (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 10/466,672

(22) PCT Filed: Jan. 26, 2002

(86) PCT No.: PCT/EP02/00830

§ 371 (c)(1),
(2), (4) Date: Jul. 21, 2003

(87) PCT Pub. No.: WO02/060744

PCT Pub. Date: Aug. 8, 2002

(65) Prior Publication Data

US 2004/0090036 A1 May 13, 2004

(30) Foreign Application Priority Data

Jan. 30, 2001  (DE) ........................................ 101 10 840

(51) Int. Cl.⁷ ................................................ B60J 7/00
(52) U.S. Cl. .............................. 296/193.07; 296/184.1; 296/191; 52/588.1
(58) Field of Search ....................... 296/193.07, 193.02, 296/204, 184.1, 187.08, 3; 52/582.2, 582.1, 584.1, 578, 588.1; 280/785, 781, 789, 797; 182/113, 106, 116

(56) References Cited

U.S. PATENT DOCUMENTS

| 3,909,059 | A | * | 9/1975 | Benninger et al. ....... 296/184.1 |
| 4,266,381 | A | * | 5/1981 | Deller .......................... 52/578 |
| 4,564,233 | A | * | 1/1986 | Booher .................... 296/184.1 |
| 4,758,128 | A | * | 7/1988 | Law .......................... 52/588.1 |
| 4,861,095 | A | * | 8/1989 | Zajic ....................... 296/184.1 |
| 4,894,419 | A | * | 1/1990 | Mizuno et al. ............. 525/189 |
| 4,951,992 | A | * | 8/1990 | Hockney ................. 296/184.1 |
| 5,238,360 | A | * | 8/1993 | Foster ..................... 414/525.9 |
| 5,287,813 | A | * | 2/1994 | Hanni et al. ................ 296/204 |
| 5,403,063 | A | * | 4/1995 | Sjostedt et al. ........ 296/193.07 |
| 5,647,184 | A | * | 7/1997 | Davis ........................ 52/588.1 |
| 5,730,485 | A | * | 3/1998 | Sjostedt et al. .......... 296/181.3 |
| 5,772,276 | A | * | 6/1998 | Fetz et al. .................. 296/204 |
| 5,791,714 | A | * | 8/1998 | Hall, Jr. .................. 296/184.1 |
| 5,791,726 | A | * | 8/1998 | Kaufman .................... 296/191 |
| 6,082,810 | A | * | 7/2000 | Bennett ................... 296/184.1 |
| 6,109,684 | A | * | 8/2000 | Reitnouer ................ 296/184.1 |
| 6,199,340 | B1 | * | 3/2001 | Davis ........................ 52/588.1 |
| 6,283,538 | B1 | * | 9/2001 | Reitnouer ................ 296/184.1 |
| 6,425,626 | B1 | * | 7/2002 | Kloepfer .................. 296/186.1 |
| 6,513,297 | B2 | * | 2/2003 | Kloepfer .................. 52/588.1 |
| 6,669,271 | B2 | * | 12/2003 | Booher ....................... 296/191 |
| 6,688,673 | B2 | * | 2/2004 | Kloepfer .................. 296/184.1 |
| 2004/0090036 | A1 | * | 5/2004 | Schillinger et al. ......... 280/166 |
| 2004/0100126 | A1 | * | 5/2004 | Kawabe et al. ........ 296/193.07 |
| 2004/0135398 | A1 | * | 7/2004 | Booher ..................... 296/182.1 |

* cited by examiner

*Primary Examiner*—Kiran Patel
(74) *Attorney, Agent, or Firm*—Pendorf & Cutliff

(57) ABSTRACT

The invention relates to a mobile work machine, especially a mobile concrete pump, comprising a chassis (10) and accessible platforms (22) which are positioned on carrier brackets (26) projecting laterally from the chassis. The aim of the invention is to produce and mount said platforms (22) in a simple manner. To this end, the platforms consist of hollow profiled rails (30, 30', 32) having a downward-facing profile wall (34) which rests against the carrier brackets (26), the rails being detachably connected to the brackets.

19 Claims, 4 Drawing Sheets

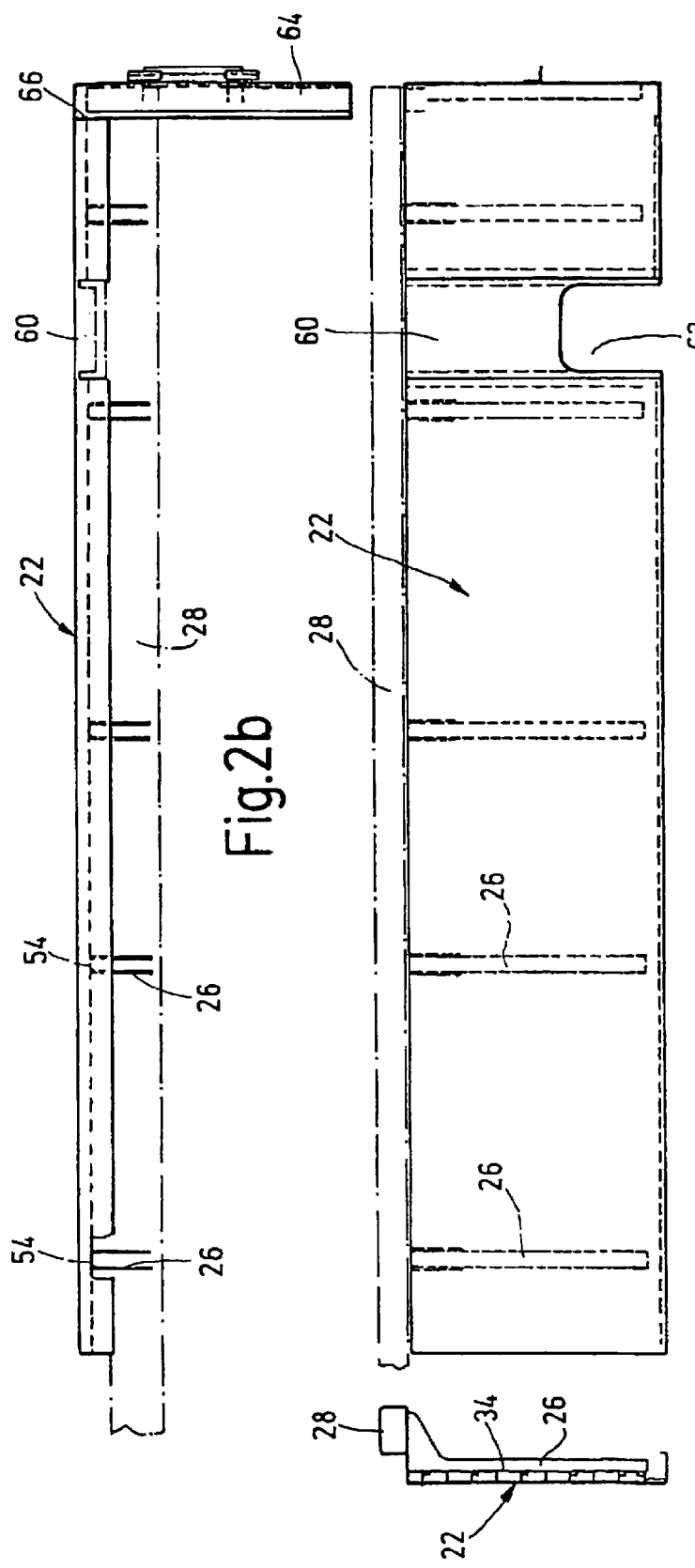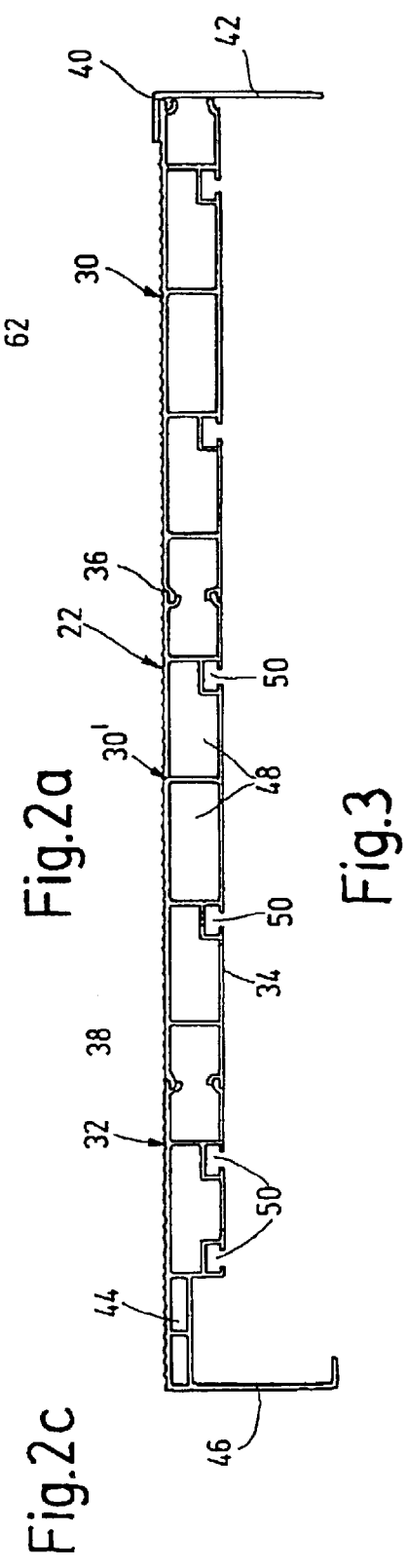

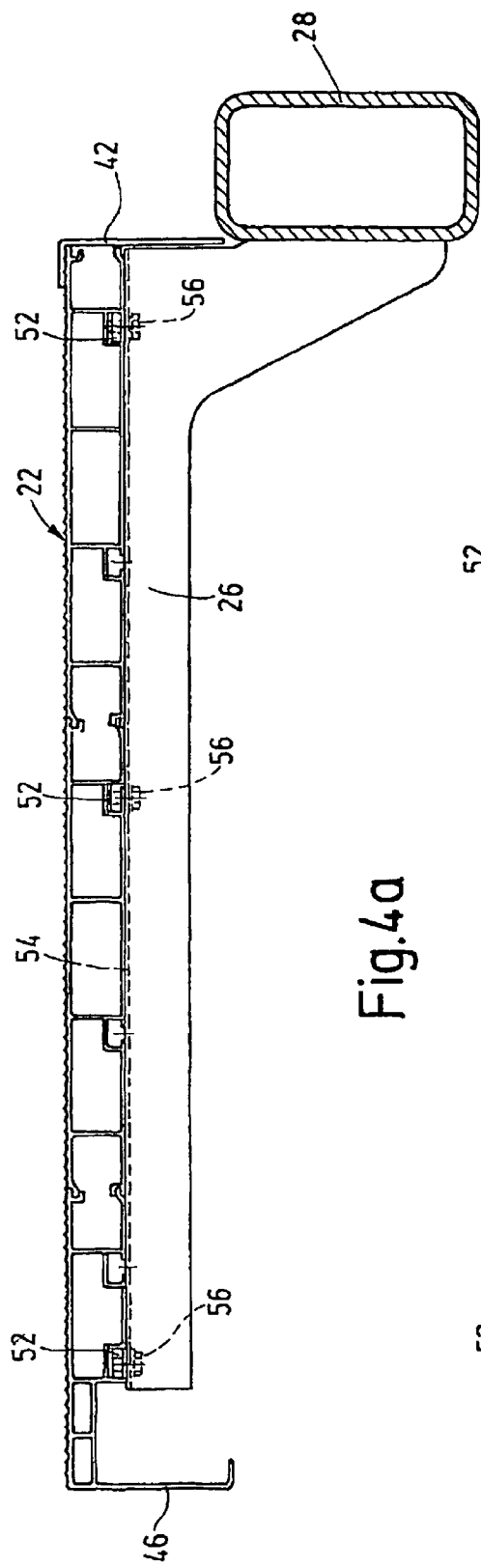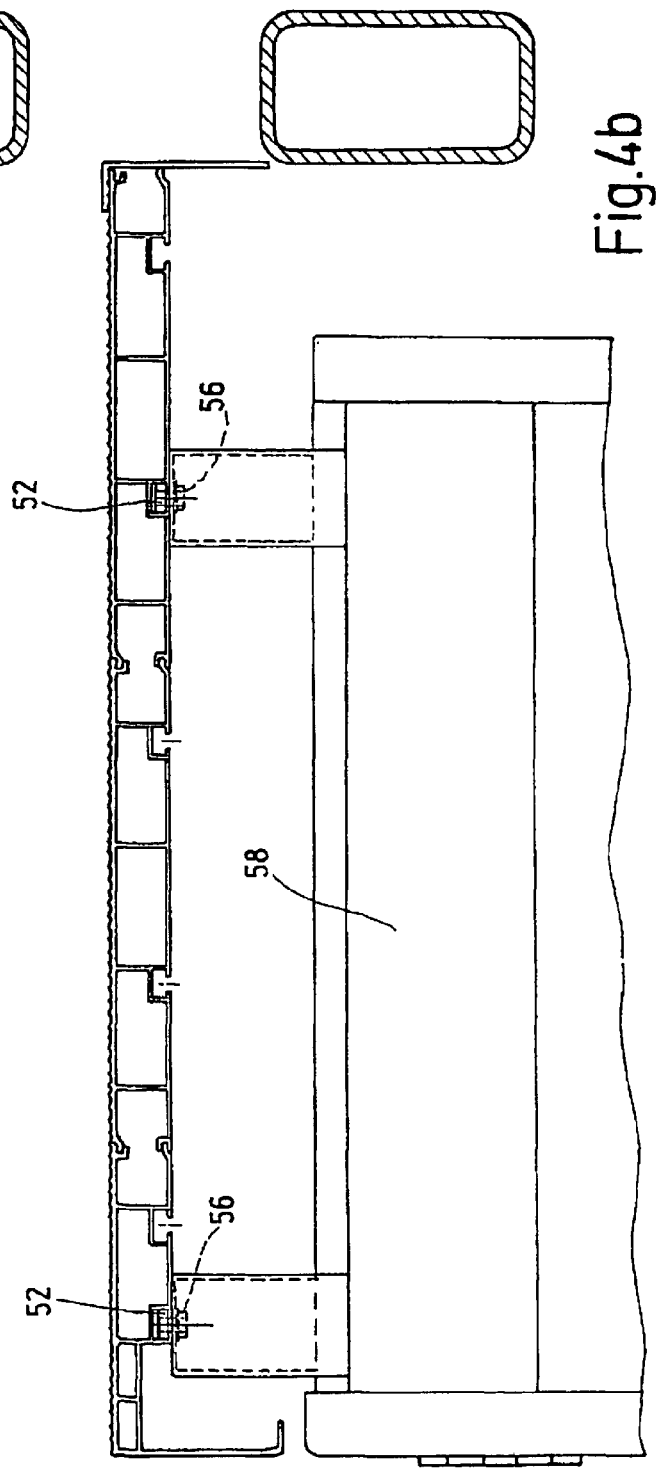

MOBILE WORK MACHINE COMPRISING ACCESSIBLE PLATFORMS

CROSS REFERENCE TO RELATED APPLICATION

This application is a national stage of PCT/EP02/00830 filed Jan. 26, 2002 and based upon DE 101 10 840.0 filed Jan. 30, 2001 under the International Convention.

BACKGROUND OF THE INVENTION

1. Field of the Invention

The invention concerns a mobile work machine, in particular a mobile concrete pump, with a chassis and with accessible platforms positioned on laterally projecting carrier brackets on the chassis.

2. Description of the Related Art

On the sides of mobile concrete pumps there are platforms, which on the one hand function as walkways and on the other hand as carrier platforms for receiving accessories, mud flaps, small parts magazines, tool boxes, squared timbers and the like. It is known to manufacture the platforms of sheet metal, in particular of sheet aluminum or sheet steel. The metal sheets are cut for length and width, and are welded crisscrossed with ribs for imparting necessary stiffness. The mounting on the chassis occurs via chassis-fixed brackets, by a tight screw connection with the metal sheets from below. In order to achieve a sufficient stiffness, a relatively small rib spacing must be maintained. The relatively large manufacturing and assembly costs as well as the extensive mounts are herein considered to be disadvantageous. Further, dirt which is thrown up during driving collects in the downward projecting ribs, and can be removed only with difficulty. Further yet, the variability of the assembly and securing possibilities leaves much to be desired, since each fastening element must be welded to a suitable location on the platform or must be screwed into an individually tailored borehole. In addition to this, there comes the problem that special channels and securing means must be welded into the platform area for utility or supply lines.

SUMMARY OF THE INVENTION

Beginning therewith it is the task of the invention to improve a mobile work machine of the above described type, particularly in regard to the platform area, in such a manner that the manufacture thereof is simplified, the warehousing of parts is simplified, and the assembly onto the carrier brackets and the connection with add-on parts is simplified and yet can be varied in design.

For the solution of this task the combination of characteristics set forth in claims 1 and 17 are proposed. Advantageous embodiments and further developments of the invention can be seen from the dependent claims.

The inventive solution is based primarily upon the idea, that the platforms should be comprised of hollow profiled rails having a downward oriented profiled wall which rests against the carrier bracket and is detachably connected to, said bracket. The hollowed profiled rails are preferably extrusion pressed parts of aluminum. In principle it is also possible to produce the hollow profile rails as extrusion molded parts of plastic or compound material.

Since the nozzles for extrusion press machines or extrusion mold machines exhibit a limited extrusion breadth, it may be necessary in the case of broad platforms that a number of these must be assembled in the transverse direction. Accordingly, in a preferred embodiment of the invention it is proposed that at least two hollow profiled rails are connected with each other along two longitudinal side abutment edges. Therewith one also has the possibility to assemble various extrusion press or extrusion mold profiles, that is, an external profile and a differently structured internal profile. The outer profile can supplementally be provided with an outer plate drawn downwards from the platform surface, which could for example be ornamented with running lights. On the backside of the plate there is sufficient space for accommodating the mounting elements, the electrical devices and the circuits for the guide lights. On an outer connection profile or on the outer plate it is besides this possible to provide hinge parts for a pivotable door or bumper.

According to a preferred embodiment of the invention, the hollow profiled rails exhibit downwardly open cut-back longitudinal grooves for receiving groove blocks or stones provided with screw holes or threaded rods. The groove stones could be placed at any position in the longitudinal grooves and are intended above all for securing the platform to the carrier brackets. The carrier brackets are preferably in the form of a cross-sectionally U-shaped carrier, which on their upwardly directed connecting cross-piece are screw fastened with the hollow profile rails via the groove stones. Further, individual groups of groove stones can be provided for mounting box or magazine shaped construction components on the platform lower side. Individual grooves or hollow chambers of the hollow profile rails are suitable for receiving lines, in particular of electrical, pneumatic or hydraulic lines. It is further possible that the hollow profile rails can be subdivided in the longitudinal direction. It is in particular possible that two platform parts are separated from each other by an intermediate piece, which is designed for example for receiving a pivotable or telescopic support leg.

On their upper side, the hollow profile rails preferably exhibit an anti-skid structured walking surface.

According to a preferred or alternative embodiment of the invention a step or ladder for climbing is provided on the end of the platform, which is provided with a tubular handrail, which is connected with a rearward pipe shaped support rail via a upper convex bent handrail part and together with the support rail borders a free space, in which at least one service or maintenance device is provided. The lines leading to this housing, in particular electrical, pneumatic or hydraulic lines, could be provided protected within the handrail and/or the support rail. In order to keep the handrail free, the at least one housing is preferably fixed to the support rail. A preferred embodiment of the invention envisions that the handrail and the support rail together form a one-piece, essentially U-shaped bent metal tube. In order to avoid collision damage in the construction site while driving in, the climb-up ladder is preferably designed to be height adjustable or flexible at least in the area of its lower most step.

BRIEF DESCRIPTION OF THE DRAWINGS

In the following the invention is described in greater detail on the basis of an illustrative embodiment shown in schematic form in the drawing. There is shown FIG. 1 a side view of a mobile concrete pump with platforms arranged laterally on the vehicle chassis;

FIG. 2*a-c* a top view, a side view and a section through a platform associated with a vehicle chassis in enlarged representation compared to FIG. 1;

FIG. 3 a section through the platform comprised of multiple assembled hollow profile rails without bracket according to FIG. 2c;

FIG. 4a a section through the platform provided on the vehicle chassis in an enlarged representation as compared to FIG. 2c;

FIG. 4b a illustration according to FIG. 4a with an add-on part secured to the lower mounting side;

DETAILED DESCRIPTION OF THE INVENTION

Figure 1:
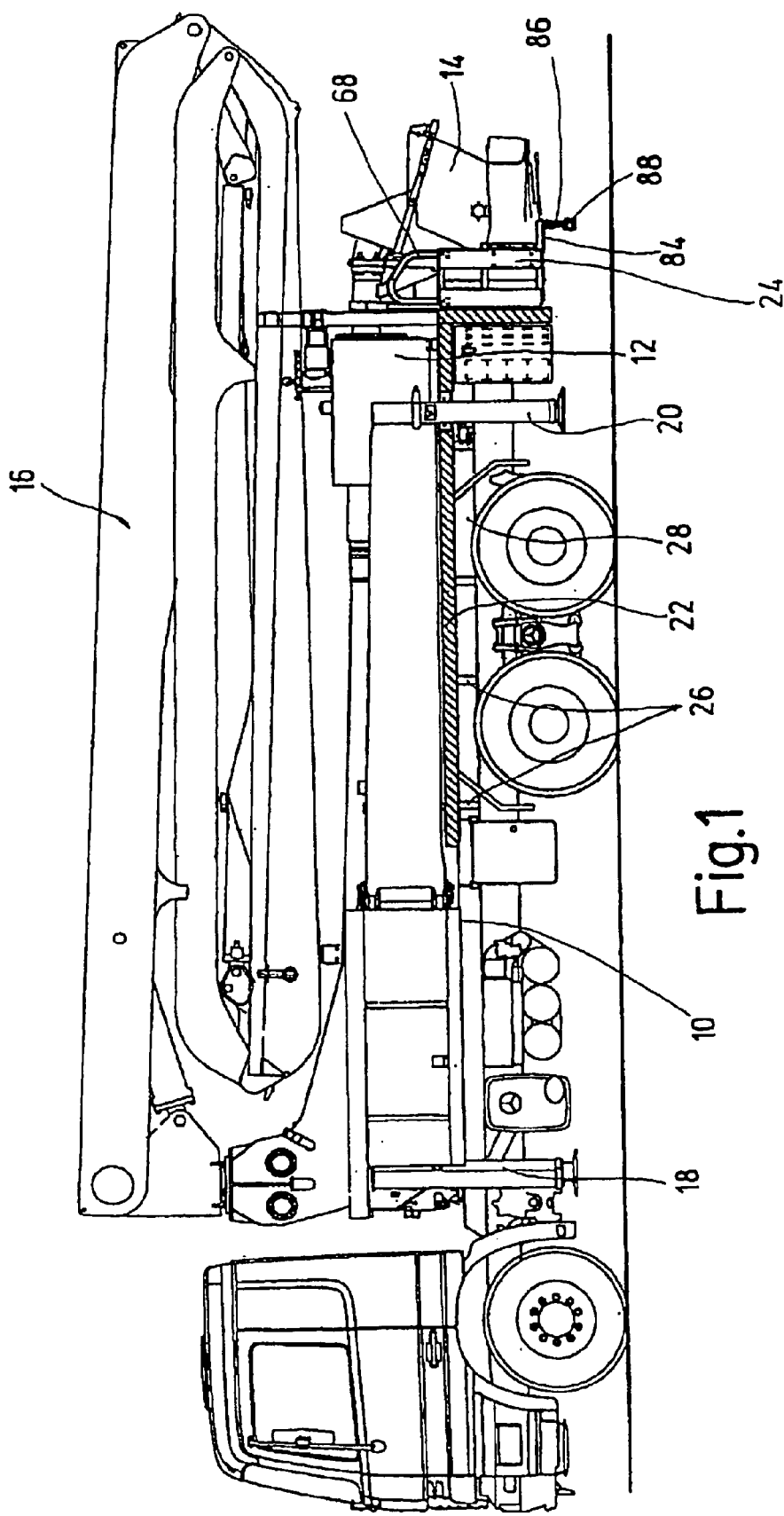

The mobile concrete pump shown in FIG. 1 comprises a vehicle chassis 10, a thick matter pump 12, a material supply container 14 and a placement boom 16 provided on the vehicle chassis, support struts 18, 20 extendable forwards and rearwards from the vehicle chassis, two platforms 22 provided laterally on the vehicle chassis along the sides of the thick material pump 12 and the placement boom 16, as well as a climb-up ladder 24 leading to the platform from the rear. The platforms 22 are provided on carrier brackets 26, which-brackets are welded to the vehicle chassis 10 and project sideways therefrom, spaced part from each other, via associated longitudinal carriers 28. The platforms 22 are comprised of hollow profile rails 30, 30', 32, lying with their downward directed wall 34 upon the carrier brackets 26, and releasably connected therewith. In the illustrated embodiment three hollow profile rails 30, 30' and 32 are form and force fittingly connected with each other along longitudinal side abutment edges 36, 38. This connection provides a type of groove and spring joint in the area of the abutment edges 36, 38. In the same groove and spring principle, an inner closure plate 42 is seated on the vehicle chassis side, on the abutment edge 40 of the inner profile rail 30. The two inner hollow profile rails 30, 30' are identical in construction, while the outer hollow profile rail 32 exhibits a closure profile 44 with an outer plate 46. The outer plate is suitable for mounting running lights, of which the electrical wiring can be provided along the inner side of the closure plate 46 of the platform. Further, in the area of the closure profile 44 and the outer plate 46 a 180° pivotable, lockable in the upward position, door or bumper can be linked.

Besides their hollow chambers 48, the hollow profile rails 30, 32', 30" exhibit downward open, cut-back longitudinal grooves 50 for receiving groove blocks or stones 52 provided with threaded bores or threaded rods. The groove stones 52 can be positioned at any position of the longitudinal groove. The groove stones 52 located in the longitudinal grooves 50 are used once for fixing the platform-forming hollow profile rails 30, 30', 32 to the carrier brackets 26. For this purpose the carrier brackets 26 are in the form of U-shaped cross-sectional carriers, which on their upward facing cross-piece 54 can be screw connected to the hollow profile rails by screws 56 via the groove stones 52 (see FIG. 4a). As can be seen from FIG. 4b, the longitudinal grooves 50 and groove stones 52 can also be used for fixing, from the bottom, add-on parts 58 such as tool boxes, magazines or the like using screws 56 from below. The hollow chambers 48 and the longitudinal grooves 50 are, besides this, suitable for housing lines or wiring, in particular of electrical, pneumatic or hydraulic lines or wiring, which must be placed along the vehicle chassis of the mobile concrete pump.

As can be seen particularly from FIG. 2a and b, the platform is subdivided into two parts in the longitudinal direction, which are separated from each other via an intermediate piece 60. The intermediate piece 60 exhibits an outwardly edge-open recess closeable via a slider for receiving the rearward support leg 20 in the pivoted-in end position.

On their rearward end, the platforms 22 are bordered by a downward directed closure plate 64, which is comprised of the same hollow profile rails 30, 30', 32 as the platform. The closure plate 64 is, on the connection location 66, screw fastened with the hollow profile rails of the platform 22 either at right angles (as shown) or beveled.

Figures 5A, 5B:
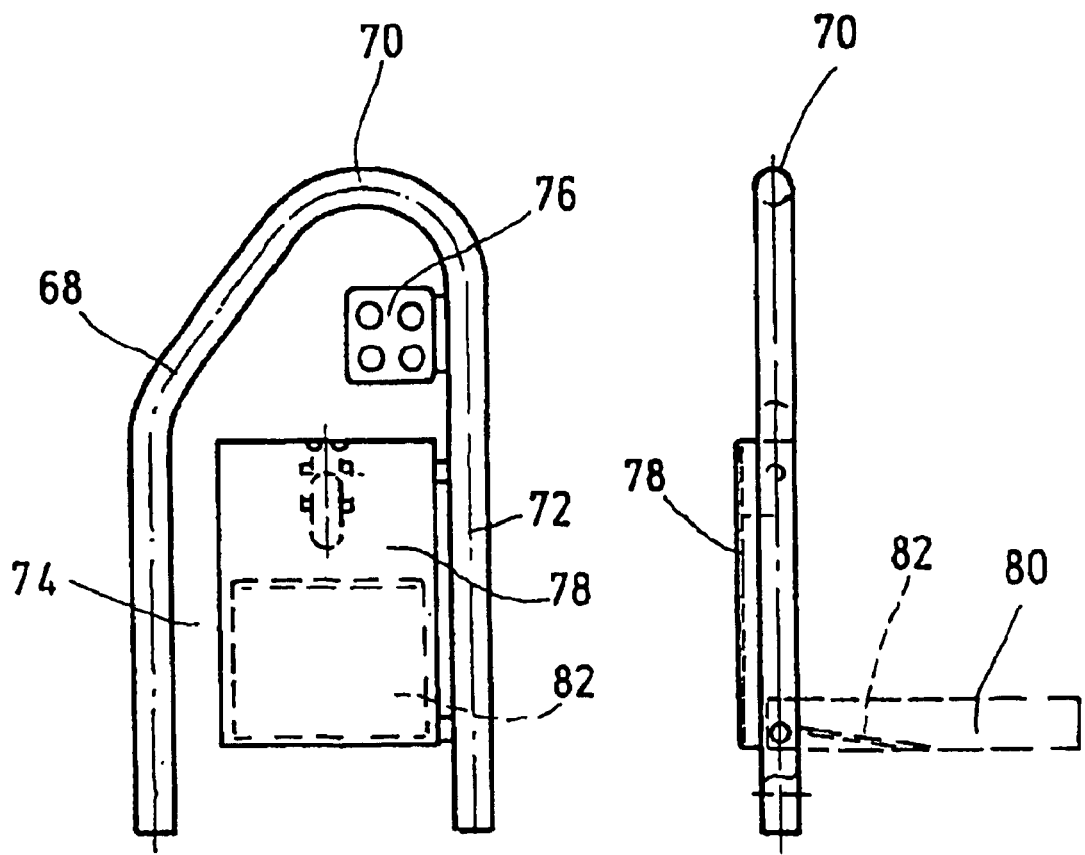
FIGS. 5a and b two different side views of a handrail with support rail for the climb-up ladder according to FIG. 1.

Connected to the closure plate 64 is the climb-up ladder 24, which is bordered on its sides by handrails 68. The handrails 68 are connected with a rearward support rail 72 into once-piece via an inverted curved handrail part 70. The handrail 68, the handrail part 70 and the support rail 72 form a U-shaped curved metal tube, which on its free ends is screw fastened with the climb-up ladder and defines or borders a free space 74 between handrail 68 and support rail 72. On the support rail 72 a service or maintenance box 76 and a suitcase-like housing 78 for storage of writing materials and writing implements is secured, which substantially utilize the free space 74 for their space requirements. The wires or lines leading to the service box 76 are channeled through the free internal space of the tubular shape handrail 78. As can be seen from FIG. 5b, the writing material container 78 serves, in the open condition of the lid 80, also as writing surface for the writing material 82.

On the lower-most step 84 of the climb-up ladder 24 a further step element 88 is secured via flexible or height-adjustable side parts 86, which facilitates an easier climb up to the step 84 and ensures that the climb-up ladder 24 cannot be damaged by collision during positioning the mobile concrete pump in the construction site.

In summary the following can be concluded: The invention relates to a mobile work machine, especially a mobile concrete pump, comprising a chassis 10 and accessible platforms 22 which are positioned on laterally-projecting carrier brackets 26 on the chassis. The aim of the invention is to produce and mount these platforms 22 in a simple manner. To this end, the platforms consist of hollow profiled rails 30, 30', 32 having a downward-facing profile wall 34 which rests against the carrier brackets 26, these rails being detachably connected to these brackets.

What is claimed is:

1. A mobile work machine, with a vehicle chassis (10) and accessible platforms (22) provided on carrier brackets (26) projecting laterally from the vehicle chassis (10), wherein the platforms (22) are comprised of hollow profile rails (30, 30', 32), of which a downward facing profile wall (34) lies on the carrier brackets (26) and is releasably connected thereto, wherein the hollow profile rails (30, 30', 32) exhibit downwards open, cut-back longitudinal grooves (50) for receiving groove stones (52) provided with threaded bores or threaded rods.

2. A mobile work machine according to claim 1, wherein at least two hollow profile rails (30, 30', 30") are provided connected with each other along two longitudinal side abutment edges (36, 38).

3. A mobile work machine according to claim 1, wherein the hollow profile rails (30, 30', 32) are extrusion press parts of aluminum.

4. A mobile work machine according to claim 1, wherein the hollow profile rails are extrusion mold parts of plastic or compound material.

5. A mobile work machine according to claim 1, wherein the carrier brackets (26) are cross-sectionally U-shaped carriers, which on their upward facing cross-piece (54) are screw fastened with the hollow profile rails (30, 30', 32) via the groove stones (52).

6. A mobile work machine according to claim 1, wherein individual groups of groove stones (52) are provided for mounting box or magazine shaped add on parts (58) to the platform lower side.

7. A mobile work machine according to claim 1, wherein individual grooves (50) or hollow chambers (48) of the hollow profile rails (30, 30', 32) are adapted for receiving lines, in particular electrical, pneumatic or hydraulic lines.

8. A mobile work machine according to claim 1, wherein the longitudinal direction at least two platform parts are provided in the form of hollow profile rails (30, 30', 32).

9. A mobile work machine according to claim 8, wherein the platform parts are separated from each other via an intermediate piece (60) for receiving an extendable support leg (20).

10. A mobile work machine according to claim 1, wherein the hollow profile rails (32), forming the platform are bordered by an outer closure profile (44), which exhibits a downward extending outer plate (46).

11. A mobile work machine according to claim 10, wherein on the closure profile (44) or on the outer plate (45) hinge parts are provided for a pivotable striker.

12. A mobile work machine according to claim 10, wherein the outer plate (46) includes receptacles for receiving running lights.

13. A mobile work machine according to claim 1, wherein the hollow profile rails (30, 30', 32) exhibit an anti-skid structured walking surface.

14. A mobile work machine according to claim 1, wherein the carrier brackets (26) are secured to a chassis-fixed longitudinal frame beam (28), preferably welded or screwed on.

15. A mobile work machine according to claim 1, wherein on the end of the platform (22) a climb-up ladder (24) with a tube-shaped handrail (68) is provided, which via an upper, convex bent handrail part (70) is connected with a rearward support rail (72) and which together with the support rail (72) defines a free space (74), in which at least one housing (76, 78), is provided, preferably for receiving a service or maintenance device.

16. A mobile work machine according to claim 15, wherein the handrail (68) and the support rail (72) are formed of a one-piece U-shaped bent metal pipe.

17. A mobile work machine according to claim 15, wherein within the handrail (68) and/or the support rail (72) lines leading to the housing, in particular electrical, pneumatic or hydraulic lines, are located.

18. A mobile work machine according to claim 15, wherein at least one housing (76, 78) is connected to the support rail (72).

19. A mobile work machine according to claim 15, the climb-up ladder (24) is flexible or height adjustable at least in the area of its lower most step (88).

\* \* \* \* \*